United States Patent
Piede et al.

(10) Patent No.: US 7,327,911 B2
(45) Date of Patent: Feb. 5, 2008

(54) OPTICAL DETECTOR CONFIGURATION AND UTILIZATION AS FEEDBACK CONTROL IN MONOLITHIC INTEGRATED OPTIC AND ELECTRONIC ARRANGEMENTS

(75) Inventors: David Piede, Allentown, PA (US); Kalpendu Shastri, Orefield, PA (US); Robert Keith Montgomery, Easton, PA (US); Prakash Gothoskar, Allentown, PA (US); Vipulkumar Patel, Breinigsville, PA (US); Mary Nadeau, Alburtis, PA (US)

(73) Assignee: SiOptical, Inc., Allentown, PA (US)

( * ) Notice: Subject to any disclaimer, the term of this patent is extended or adjusted under 35 U.S.C. 154(b) by 63 days.

(21) Appl. No.: 11/253,456

(22) Filed: Oct. 19, 2005

(65) Prior Publication Data

US 2006/0083144 A1    Apr. 20, 2006

Related U.S. Application Data

(60) Provisional application No. 60/620,156, filed on Oct. 19, 2004.

(51) Int. Cl.
*G02B 6/12* (2006.01)
*G02B 6/10* (2006.01)

(52) U.S. Cl. .................. 385/14; 385/129; 385/130

(58) Field of Classification Search .......... 250/227.11; 385/1–3, 14, 31, 36, 37, 39, 40, 43, 129–132; 398/195–198, 213; 356/477
See application file for complete search history.

(56) References Cited

U.S. PATENT DOCUMENTS

| | | | |
|---|---|---|---|
| 6,021,248 A * | 2/2000 | Cornish et al. ............. 385/147 |
| 6,567,436 B1 | 5/2003 | Yao et al. |
| 6,614,213 B1 | 9/2003 | Whitbread et al. |
| 6,720,830 B2 | 4/2004 | Andreou et al. |
| 6,910,812 B2 | 6/2005 | Pommer et al. |
| 7,065,301 B2 * | 6/2006 | Shastri et al. ............... 398/183 |
| 2002/0149780 A1 * | 10/2002 | Trinh ....................... 356/477 |
| 2004/0165838 A1 * | 8/2004 | Pliska et al. ................. 385/90 |
| 2004/0188794 A1 | 9/2004 | Gothoskar et al. |
| 2004/0213518 A1 | 10/2004 | Ghiron et al. |
| 2005/0110108 A1 * | 5/2005 | Patel et al. ................ 257/453 |
| 2005/0185681 A1 | 8/2005 | Ilchenko et al. |

FOREIGN PATENT DOCUMENTS

GB    2378525 A  *  2/2003

\* cited by examiner

*Primary Examiner*—Georgia Epps
*Assistant Examiner*—Suezu Ellis
(74) *Attorney, Agent, or Firm*—Wendy W. Koba

(57) ABSTRACT

An improvement in the reliability and lifetime of SOI-based opto-electronic systems is provided through the use of a monolithic opto-electronic feedback arrangement that monitors one or more optical signals within the opto-electronic system and provides an electrical feedback signal to adjust the operation parameters of selected optical devices. For example, input signal coupling orientation may be controlled. Alternatively, the operation of an optical modulator, switch, filter, or attenuator may be under closed-loop feedback control by virtue of the inventive monolithic feedback arrangement. The feedback arrangement may also include a calibration/look-up table, coupled to the control electronics, to provide the baseline signals used to analyze the system's performance.

23 Claims, 10 Drawing Sheets

OPTICAL DETECTOR CONFIGURATION AND UTILIZATION AS FEEDBACK CONTROL IN MONOLITHIC INTEGRATED OPTIC AND ELECTRONIC ARRANGEMENTS

CROSS-REFERENCE TO RELATED APPLICATION

This application claims the benefit of U.S. Provisional Application No. 60/620,156, filed Oct. 19, 2004.

TECHNICAL FIELD

The present invention relates to the fabrication of monolithic arrangements of integrated optic and electronic devices and, more particularly, to the utilization of optical detector feedback configurations to provide closed-loop control of such monolithic arrangements.

BACKGROUND OF THE INVENTION

In an SOI-based opto-electronic platform, relatively thin (e.g., <1 µm) silicon waveguides are used to distribute light across the entire chip and provide multiple optical functions (for example, splitting/combining, modulation, switching, wavelength multiplexing/demultiplexing, add/drop, equalization and dispersion compensation). The ability for light coupling and manipulation in a thin waveguide on an SOI platform enables a true integration of optics and microelectronics on a single silicon chip. One of the reasons for the high cost, high power consumption and large form factors of the optical components/subsystems in the optical communication industry is the lack of available component integration. Today's opto-electronic industry relies on discrete building blocks and hybrid integration of various components made out of various material systems. Similar to the IC industry in the 1960s, these discrete components are open loop, where the loop is then closed externally (using, for example, external optics and electronics), resulting in lower yields and high costs.

To realize the full potential of the monolithic integration of optics and electronics on silicon, the performance and yield of the optical and opto-electronic functions must be improved to match the performance and yield of the electronics. Thus, a need remains in the art for an on-chip solution for managing variations in the optical performance and improve the overall operability of such devices.

SUMMARY OF THE INVENTION

The need remaining in the prior art is addressed by the present invention, which relates to the fabrication of monolithic arrangements of integrated optic and electronic devices and, more particularly, to the utilization of optical detector feedback configurations to provide closed-loop control of such monolithic arrangements.

In accordance with the present invention, electronic feedback control circuitry is formed as a monolithic arrangement within the surface silicon layer of a silicon-on-insulator (SOI) structure, along with the desired electronic and optic devices, allowing for optimization of optical performance in the presence of situations such as manufacturing variations, temperature fluctuations, power supply variations, aging, etc. The feedback loop is closed by the use of an optical detector is association with the feedback electronics.

The monolithic feedback electronics includes, at least, an A/D converter for transforming an analog output from the associated photodetector into a digital representation. Control electronics, responsive to the output from the A/D converter, is used to supply a feedback signal to one or more components of the opto-electronic system in order to control the response of the system. In some embodiments of the present invention, an additional calibration and/or look-up table may be included within the monolithic feedback electronics and queried by the control electronics to determine the proper feedback signal. In further embodiments of the present invention, there may be a communication interface between the control electronics and an "off chip" system that is used to either initialize the control electronics, retrieve performance data from the control electronics, or both.

Various embodiments of the present invention utilize the inventive combination of the monolithic feedback loop and optical detector to optimize, for example, one or more of the following: (1) the output power from an opto-electronic modulator; (2) optical input coupling power; (3) attenuation in a variable optical attenuator; (4) filtering; (5) arrays of optical devices and more.

Other and further embodiments of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
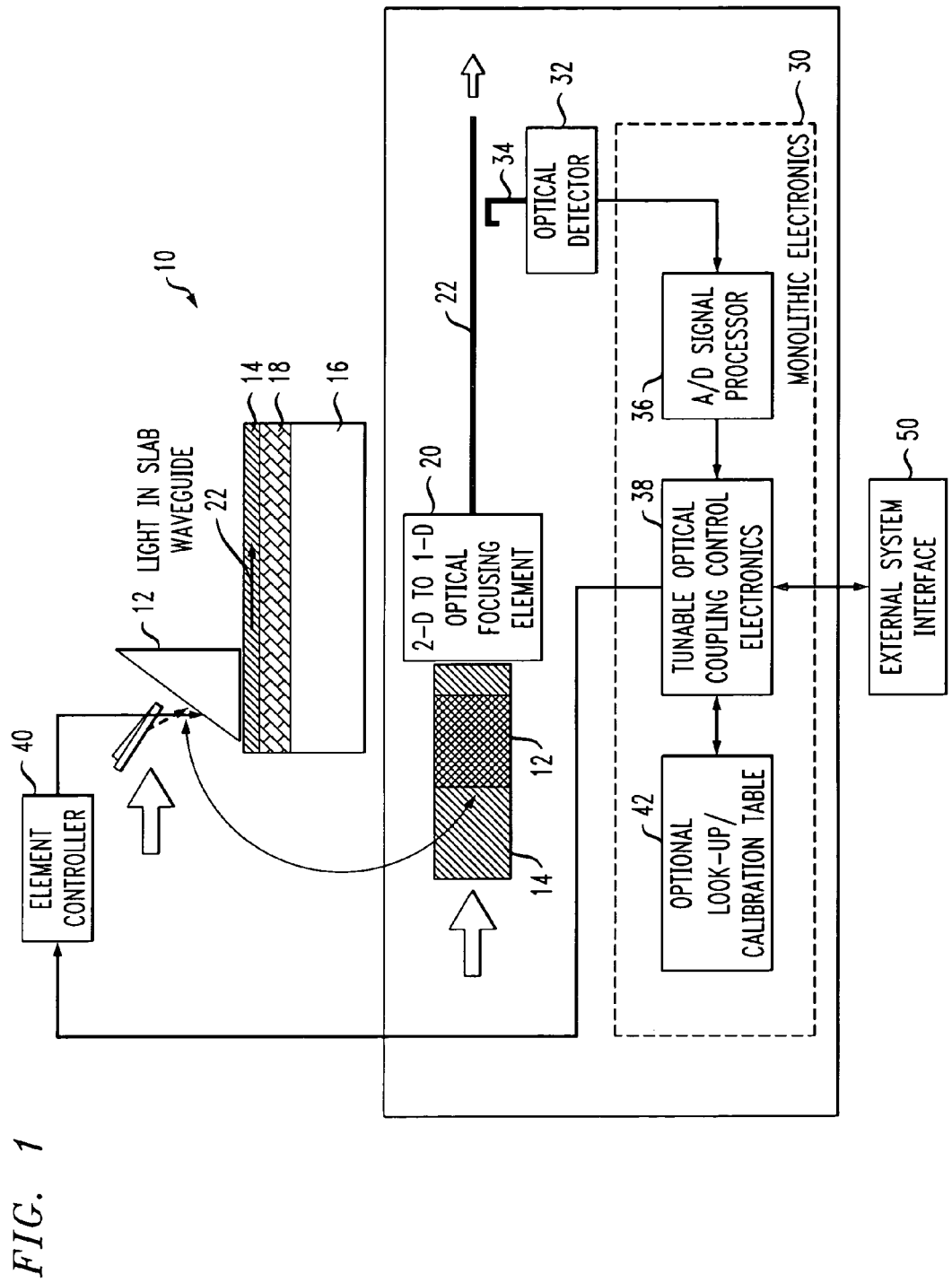
FIG. 1 illustrates, in simplified form, an exemplary closed-loop feedback-controlled SOI-based input coupling arrangement.

FIG. 1 illustrates, in a combination of a simplified top view and side view, an exemplary closed-loop feedback-controlled optical input coupling arrangement 10 formed in accordance with the present invention. As described in various other prior references regarding silicon-on-insulator (SOI) optical systems, a silicon prism, such as prism 12, is used to couple an optical signal into a sub-micron thick silicon surface layer 14 of an SOI structure that further comprises a silicon substrate 16 and buried oxide layer 18.

As shown particularly in to top view of FIG. 1, the coupled optical signal passes through a focusing element 20 and thereafter into a relatively thin optical waveguide 22. Focusing element 20, a silicon-based optical element, is used to convert the two-dimensional propagating optical signal into a one-dimensional optical signal, bounded in both its width and height by waveguide 22. It is well known that the efficiency of this type of coupling arrangement is based, at least in part, on the angle at which the incoming optical beam impinges input coupling facet 24 of prism coupler 12. In the particular arrangement as shown in FIG. 1, a movable reflective element 26 (such as, for example, a MEMS device) is used to intercept the incoming light beam and control the orientation and/or position of the beam impinging input coupling facet 24.

In accordance with the present invention, a closed-loop, monolithic feedback electronic arrangement 30 is used to measure the power of the optical signal propagating along waveguide 22, the coupled optical power being dependent in part upon the amount of light coupled in through prism 12. Advantageously, feedback electronics 30 may comprise a monolithic structure of conventional electronic components used to perform well-known functions, as described below. As shown in FIG. 1, closed-loop feedback electronics 30 is coupled to the output of an optical detector 32 (such as, for example, a polygermanium, SiGe, silicide-based Schottky diode, etc) to capture a portion of the propagating output signal, using an optical coupler 34 to tap off a slight portion (for example, about 1%) of the signal propagating along waveguide 22. In this and the remaining figures, a thicker and darker lead line is used to illustrate an "optical" waveguide, with a thinner and lighter lead line used to illustrate an "electrical" signal path. It is to be understood that while feedback electronics 30 is illustrated as integrated within the same silicon substrate as the remainder of the opto-electronics configuration, feedback electronics 30 may also be formed on a separate substrate that is thereafter mated with the SOI-based opto-electronic structure. That is, a flip-chip or stacked integrated circuit arrangement may be used to provide the desired feedback arrangement of the present invention.

Referring back to FIG. 1, the analog electrical signal output from optical detector 32 is thereafter applied as an input to an analog-to-digital (A/D) converter 36 within monolithic feedback electronics 30, which functions to generate a digital representation of the measured optical signal. The digital representation is applied as an input to a tunable control electronics 38, which is programmed to analyze the signal, and determine if an adjustment in the input coupling orientation is required to improve the input optical coupling efficiency.

The output from tunable control electronics 38 is then used as a "control" signal electronic output from monolithic feedback electronics 30 to modify the input coupling arrangement, in this case as an input to a position adjustment arrangement 40 to alter the position of optical element 26 and thus provide an adjustment in the input coupling angle and/or position of the optical signal at prism coupling facet 24. Optical element 26 may comprise, for example, a reflective element, a transmissive element or a train of such elements. In accordance with the present invention, optical detector 32 and the various electronic components within closed-loop monolithic feedback electronics 30 are integrated within the same SOI structure as the remainder of the components in the opto-electronic arrangement. Thus, the monolithic closed-loop arrangement of the present invention is capable of continuously monitoring the performance of the exemplary input coupler and modifying the orientation of reflective coupling element 26, as needed, as the operating conditions change (e.g., ambient temperature, age of components, etc.). Although the particular embodiment illustrated in FIG. 1 utilizes a prism device as an input coupler, feedback electronics 30 may be used with a variety of other coupling arrangements (necessarily formed as active devices), including (but not limited to), inverse tapered waveguides, optical gratings, horn waveguides, where feedback electronics 30 is utilized to "tune" the properties of such devices to achieve maximum coupling efficiency.

Advantageously, the utilization of a monolithic structure in accordance with the present invention allows for additional elements to be easily incorporated within inventive closed-loop feedback electronics 30. Referring to FIG. 1, a look-up/calibration table 42 may be added to feedback electronics 30, where in this particular application table 42 stores various optical power values, and a listing of input signal wavelengths and reflective element orientations associated with the power values. Additionally, an external system interface 50, located "off-chip" may be used to load initial values into controller 38 (such as during factory installation), or system interface 50 may be used to interrogate controller 38 and download its stored values to external monitoring systems (as used, for example, for quality control/assurance purposes).

Figure 2:
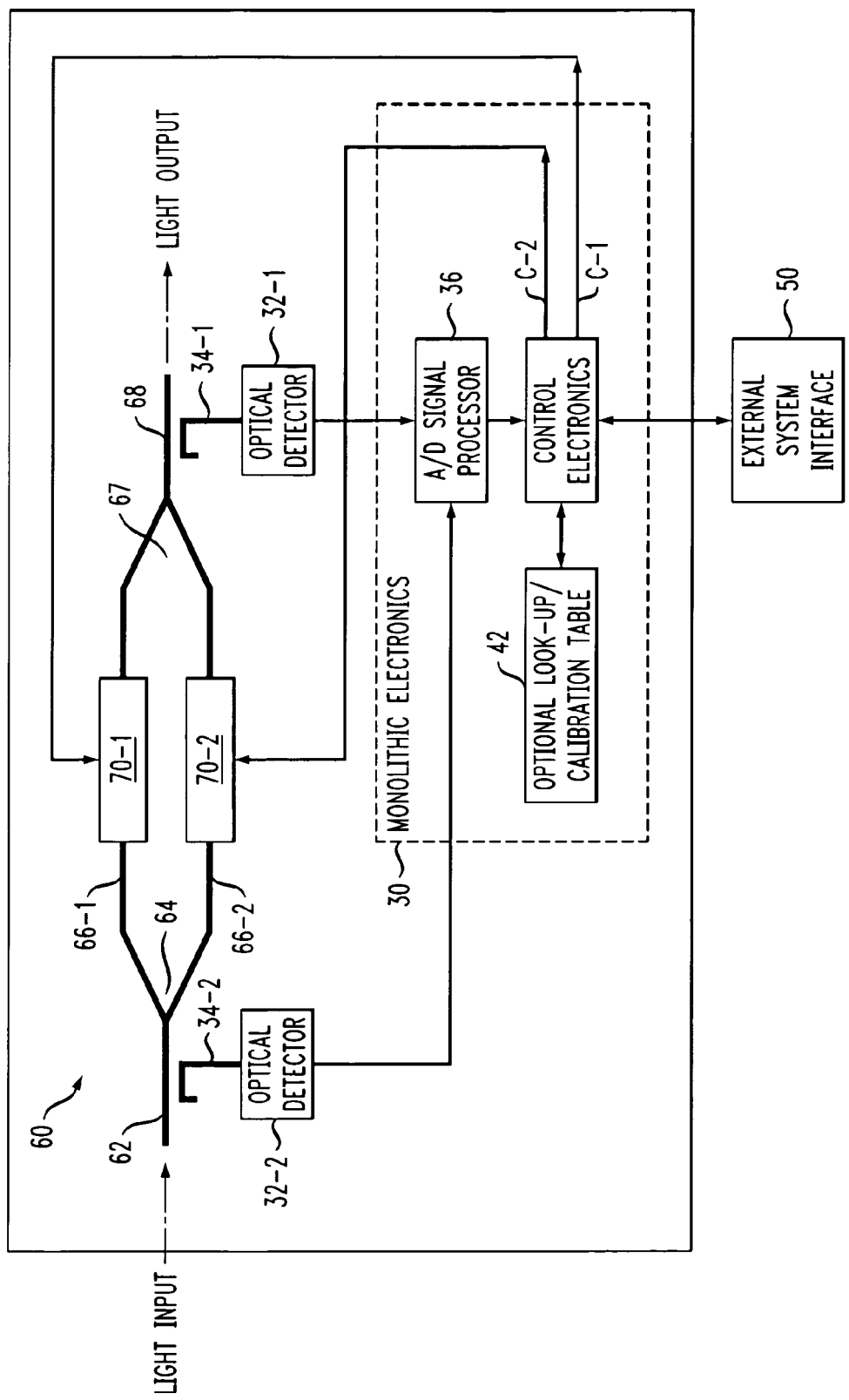
FIG. 2 contains a diagram of an alternative embodiment of the present invention that utilizes the monolithic feedback arrangement in association with a modulator (in this case, a Mach-Zehnder modulator)

FIG. 2 illustrates an arrangement for utilizing closed-loop feedback arrangement 30 of the present invention in association with a modulator 60, such as a Mach-Zehnder modulator. As shown in FIG. 2, modulator 60 includes an input waveguiding section 62, a Y-splitter 64 and a pair of parallel waveguides 66-1 and 66-2, where the parallel waveguides are thereafter re-coupled within a Y-combiner 67 into an output waveguide section 68. An optical input signal is coupled into input section 62, passes through parallel waveguides 66-1 and 66-2, and exits through output waveguide section 68. A pair of phase shifting electrodes 70-1 and 70-2 are used to control the optical path length "seen" by signals propagating along waveguides 66-1 and 66-2, respectively, so as to adjust the characteristics of the output signal propagating along waveguide section 68.

In accordance with the present invention, a portion of the optical output signal propagating along waveguide section 68 is tapped off by first waveguide coupler 34-1 and applied as an input to a first optical detector 32-1. Similarly, a portion of the applied input signal propagating along input waveguide section 62 is tapped off by a second waveguide coupler 34-2 and applied as an input to a second optical detector 32-2. It is to be understood that as an alternative to utilizing an optical detector and associated tap waveguide, an "in-line" detector may be used, avoiding the need for an additional waveguide structure. As with the arrangement described above, the tapped-off optical signals are converted into analog equivalent representations. The pair of analog signals representing the optical input signal and the optical output signal are then applied, as separate inputs to monolithic feedback electronics 30 and, in particular, as separate inputs to A/D converter 36 (or, alternatively, each signal may be applied as an analog input to separate A/D converters).

The digital outputs from A/D converter 36 are thereafter applied as inputs to control electronics 38, where in this application control electronics 38 performs an analysis based, for example, upon the ratio of the measured signals. The results of this analysis is then used to determine if any modifications need to be made to the signals used to control modulator 60 (i.e., the signals applied to phase shifting electrodes 70-1 and 70-2) so as to improve the performance of modulator 60. Properties such as, for example, extinction ratio, optical output power, optical "eye" quality and bit error ratio (BER) may all be analyzed by control electronics 38 of the present invention. In particular, acceptable values for each of these parameters may be stored within controller 38 or, alternatively, in look-up table 42 (if such a table is present within feedback arrangement 30). By detecting the ratio of the power between the two detectors, and knowing the DC and AC voltages applied to each phase shifter, feedback electronics 30 of the present invention can adjust one or both of the phase sifting electrical input signals to optimize the performance of modulator 60.

More generally, closed-loop feedback system 30 of the present invention may be used in conjunction with modulator 60 to perform phase shifting through a variety of different methods, including introducing thermal changes to the phase shifting elements and/or by modifying free carrier charges within the waveguide. Dither tones, as well known in the art, may also be impressed upon the propagating signals and used to optimize the extinction ratio of modulator 60. In the particular utilization of feedback system 30 with modulator 60, look-up table 42 may be used to provide temperature compensation values.

Figure 3:
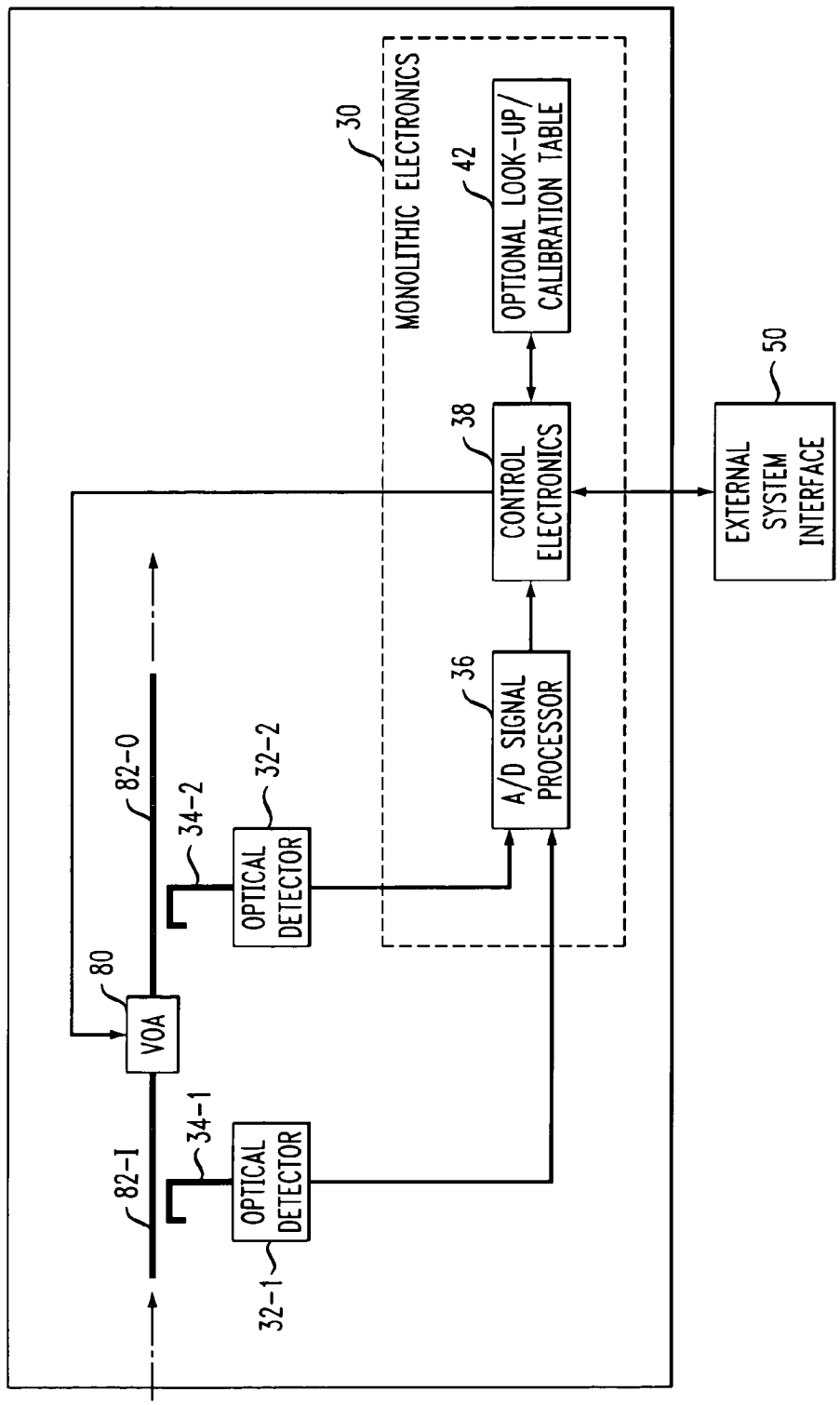
FIG. 3 illustrates the utilization of the closed-loop inventive feedback arrangement in conjunction with a variable optical attenuator (VOA)

Variable optical attenuators (VOAs) are utilized widely throughout optical communication networks, primarily to control the optical power propagating along a waveguide. FIG. 3 illustrates the utilization of closed-loop monolithic feedback arrangement 30 in conjunction with an exemplary VOA 80 to accurately set and control the degree of attenuation that is provided. Referring to FIG. 3, VOA 80 is illustrated as disposed along an optical waveguide 82, with an input optical signal applied along an input waveguide section 82-I, which is thereafter coupled to the input of VOA 80. The output from VOA 80 is then coupled into output waveguide section 82-O. In the utilization of closed-loop monolithic feedback electronics 30 with VOA 80, a first optical detector 32-1 is used to measure the power level of the optical input signal and a second optical detector 32-2 is used to measure the power level of the optical output signal, thus providing a direct measure of the function of VOA 80.

As shown, the analog electrical representations of the measured input and output signals are applied as separate inputs to A/D signal processor 36 of feedback electronics 30, where the digital outputs from processor 36 are thereafter applied as inputs to control electronics 38. As a function of the values for the digital representations, control electronics 38 will determine if any adjustments in the degree of attenuation provided by VOA 80 are required. A control signal output from electronics 38 is thus used as an adjusting input signal to VOA 80. As with the arrangements discussed above, a calibration/look-up table 42 may be included within the monolithic feedback electronics 30, where table 42 may store the various adjustment values required for different possible attenuation outputs. Also, control electronics 38 may include a communication path to external system interface 50, where this interface may be used to initialize the operation of control electronics 38, load values into table 42, communicate new attenuation settings to optimize the overall system performance, or serve as a conduit to download values stored in control electronics 38 for analysis by an off-chip system.

Accordingly, as the operation of VOA 80 changes (as a function of, for example, changes in the ambient temperature or age of the devices), the change will be measured within closed-loop feedback system 30 and used to generate an electrical feedback signal that is applied as a control input to VOA 80 and modify the applied attenuation, as need be.

There are many optical communication systems that utilize filtering to provide wavelength sensitivity to the system. Such filtering may be used to remove "noise" signals from a single wavelength signal propagating along a waveguide. Alternatively, an optical filter may be used to select one particular wavelength (or a group of wavelengths) for use from a number of different wavelengths presented as an input. As with the VOA arrangement discussed above, closed-loop monolithic feedback electronics 30 of the present invention may be used in conjunction with an associated SOI-based optical filter to optimize its performance in light of variations that may occur over time (i.e., aging, temperature drift, etc.) or as a result of variations in the manufacturing/fabrication process, as particularly associated with integrating optical elements within an SOI-based structure.

Figure 4:
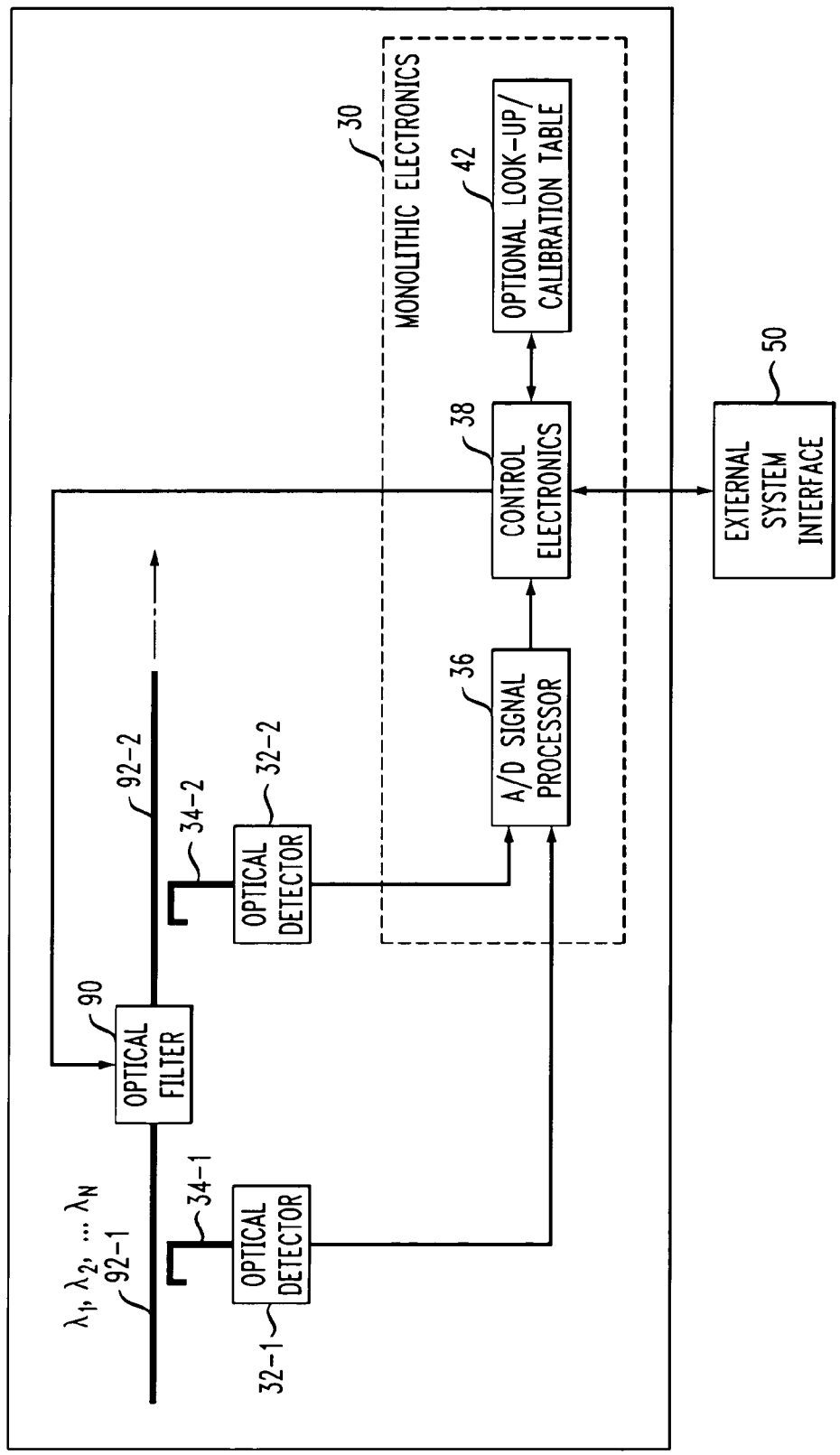
FIG. 4 contains an exemplary embodiment of an optical filtering arrangement utilizing the monolithic feedback electronics of the present invention.

FIG. 4 illustrates an exemplary SOI-based arrangement of an optical filter 90 disposed along an optical waveguide 92 (with an input waveguide section 92-1 and an output waveguide section 92-2) and feedback electronics 30, all formed as a monolithic structure within the same SOI-based substrate. Particularly for situations utilizing dense wavelength division multiplexing (DWDM), where various input wavelength signals are closely spaced, the use of on-chip feedback in accordance with the present invention provides a highly reliable arrangement for accurately controlling the wavelength of the optical signal exiting optical filter 90. For example, as shown in FIG. 4, a plurality of optical signals operating at different wavelengths $\lambda_1, \lambda_2, \ldots, \lambda_N$ are applied as inputs to optical filter 90, where it is desired that only the signal operating at wavelength $\lambda_1$ be further propagated. By measuring the value of this output signal with detector 32-2 of feedback arrangement 30, the parameters of optical filter 90 can be adjusted as necessary to prevent drifting of the wavelength value.

Figure 5:
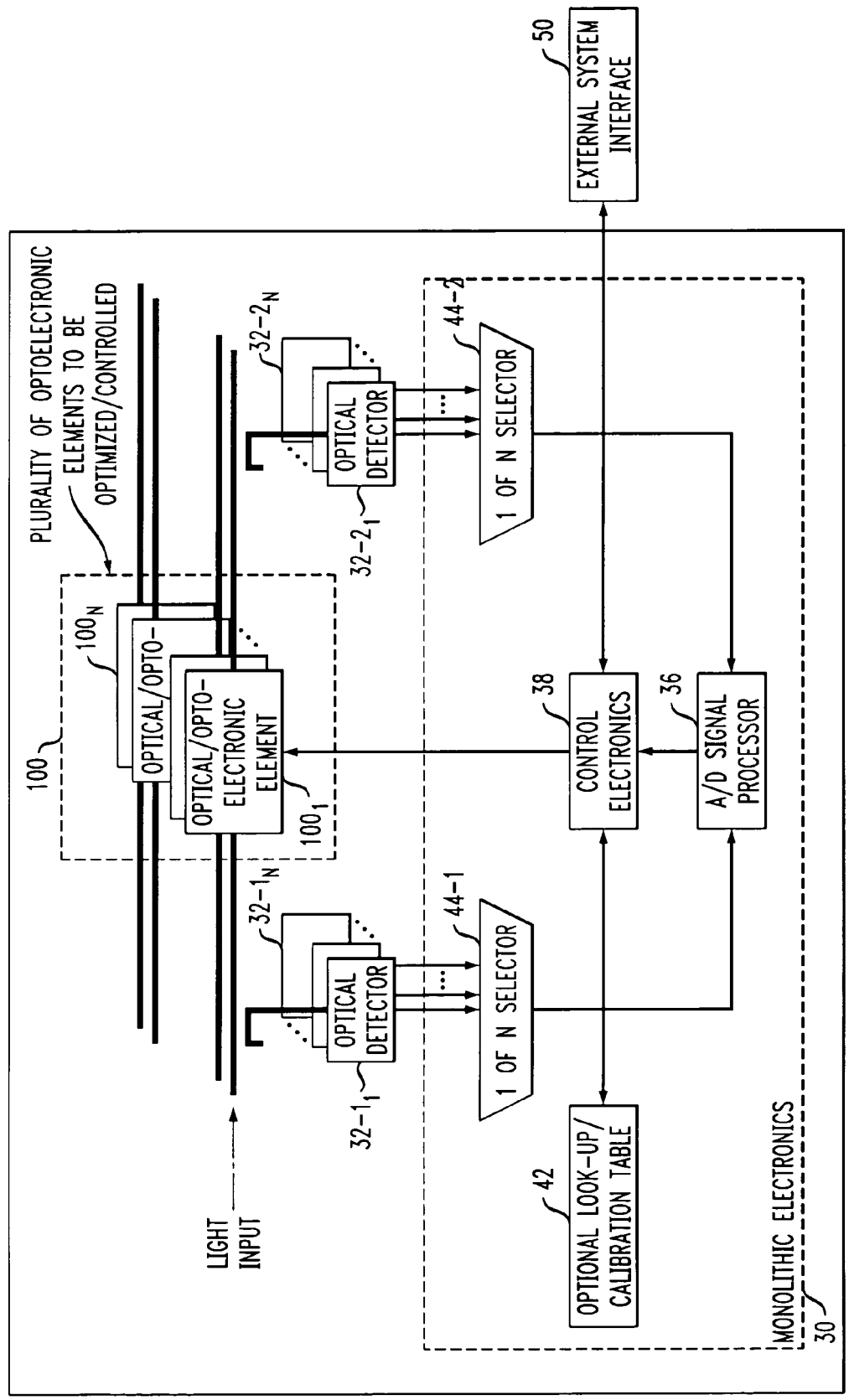
FIG. 5 is an embodiment of the present invention particularly configured for use with a plurality of separate optical devices.

As a further advantage of the monolithic arrangement of the present invention, the closed-loop feedback may be used with an array of optical/opto-electronic devices formed on a single SOI substrate. FIG. 5 illustrates an exemplary embodiment of the present invention where closed-loop feedback electronics 30 is configured for use with an array of N optical devices $100_1$-$100_N$, where the N devices may comprise a variety of different devices, or an array of identical devices. In this particular embodiment of the present invention, closed-loop feedback arrangement 30 further comprises a pair of 1-of-N electronic selectors 44-1 and 44-2, where selector 44-1 is coupled to receive the measured optical input signals from a plurality of optical detectors $32\text{-}1_1$ through $32\text{-}1_N$ located at the input to the associated plurality of N optical devices $100_1$-$100_N$. Similarly, selector 44-2 is used to determine which one of the associated optical output signals from devices $100_1$-$100_N$ is to be analyzed at a particular time. As shown, selector 44-2 is coupled between the output of a plurality of optical output detectors $32\text{-}2_1$ through $32\text{-}2_N$ and the input of A/D converter(s) 36, such that the analog output signal from only a selected detector 32-2 will be applied as an input to A/D converter(s) 36.

Figure 6:
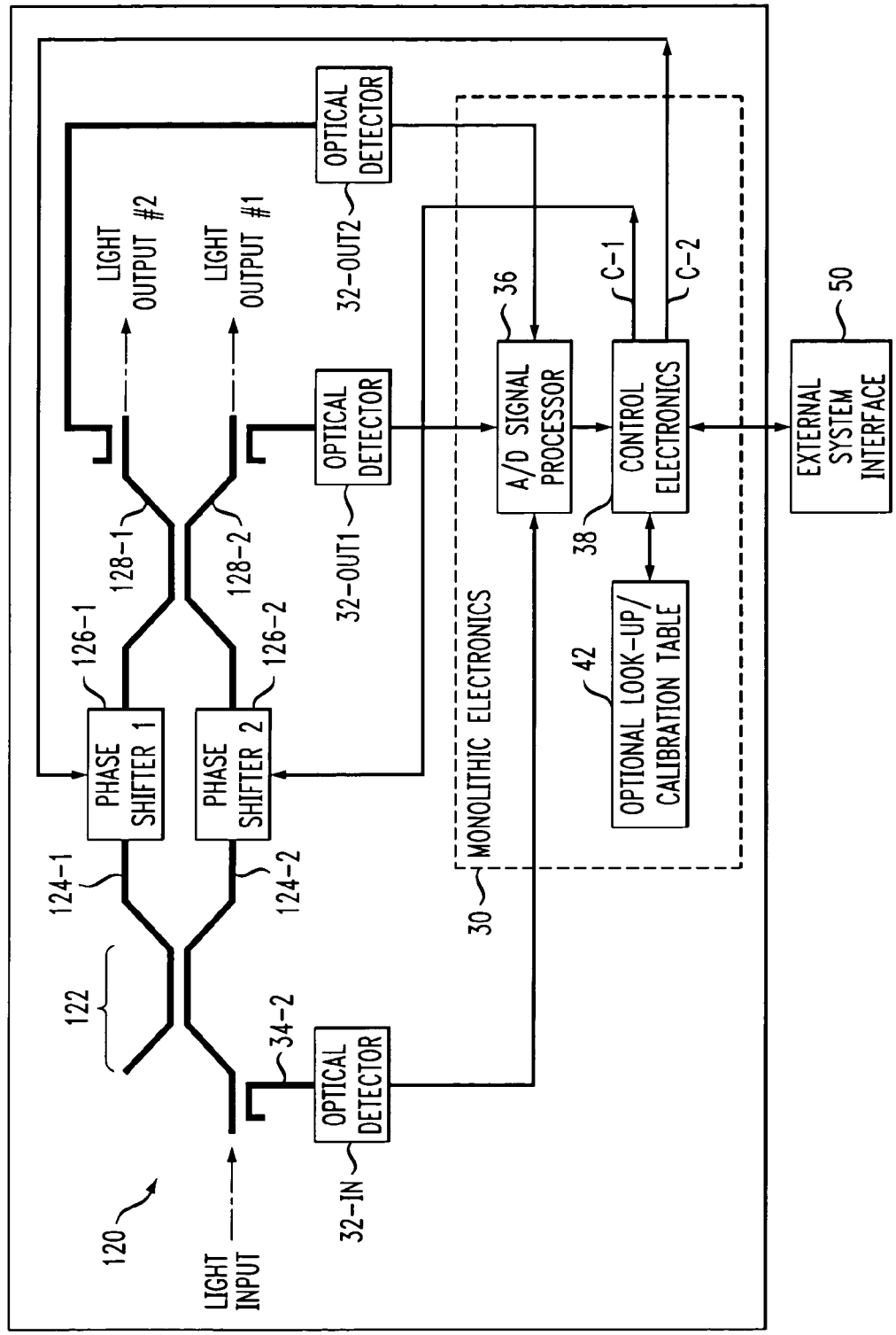
FIG. 6 contains a diagram of an exemplary optical switch utilizing the monolithic feedback arrangement of the present invention.

A monolithic, SOI-based optical switch arrangement 120, including feedback electronics 30 of the present invention is illustrated in FIG. 6. As shown, switch 120 included an input coupling element 122, such as a pair of evanescently coupled waveguides, for introducing the input optical signal to the system. The signal is then split along waveguides 124-1 and 124-2, where a pair of phase shifters 126-1 and 126-2 are disposed along waveguides 124-1 and 124-2, respectively. By controlling electrical signals applied to phase shifters 126-1 and 126-2, the output optical signal may be configured to switch between a first output waveguide 128-1 and a second output waveguide 128-2. Various parameters associated with the optical switching function (such as, for example, its bit error rate (BER)) may be controlled, in accordance with the present invention by monitoring both the power present in the input optical signal and the optical signal power present along each output signal path.

In accordance with the present invention, therefore, a pair of output optical detectors, denoted 32-out1 and 32-out2 are disposed to tap off a portion of the signal propagating along waveguides 128-1 and 128-2, respectively. An input monitor comprises an optical detector 32-in and associated waveguide 34-in. As with the arrangements described above, optical detectors 32-out1 and 32-out2 generate electrical analog output signals, which are thereafter applied as inputs to A/D processor 36 of monolithic electronics 30. The digital output from processor 36 is thereafter applied as a input to control electronics 38, which produces two output control signals, denoted C-1 and C-2.

Figure 7:
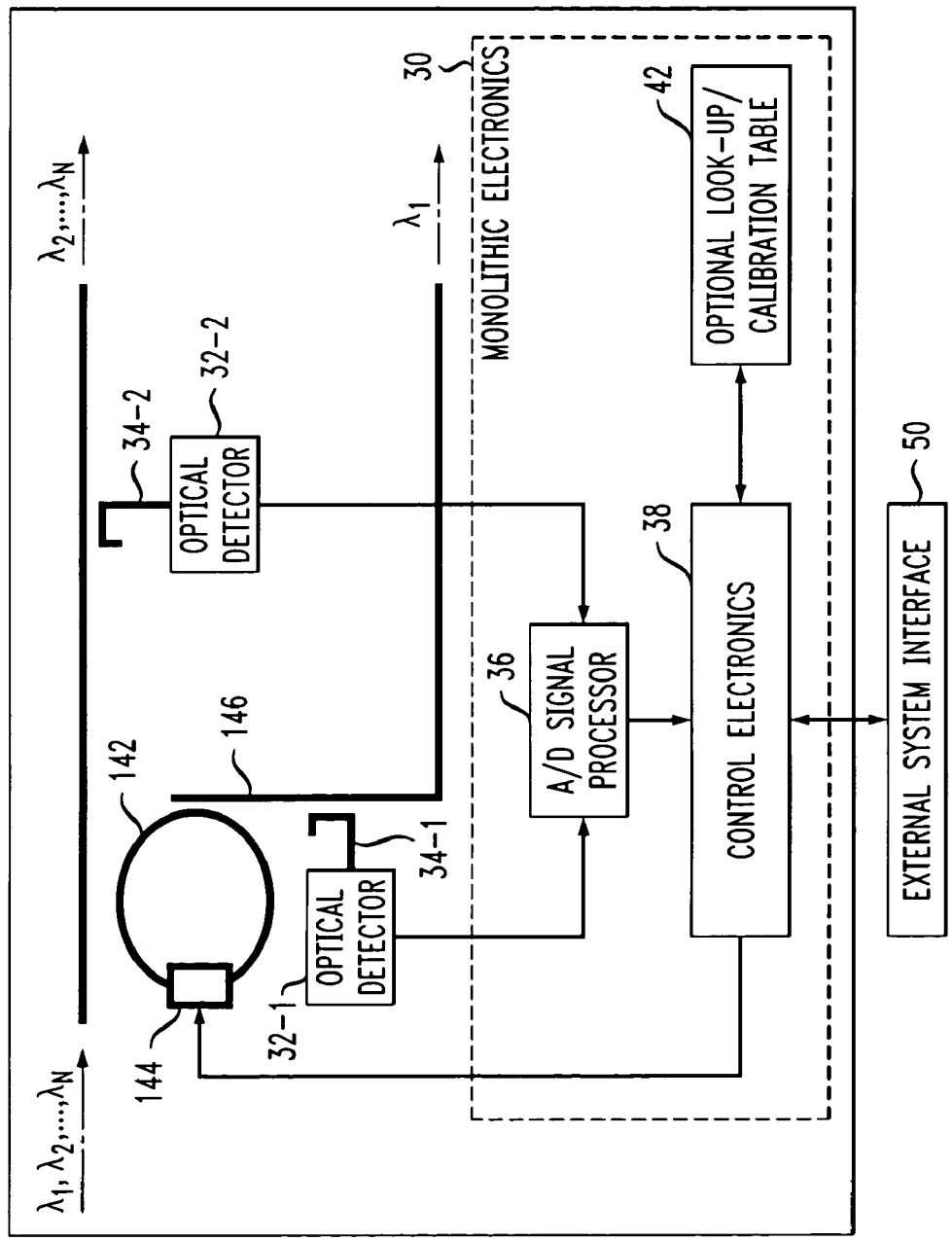
FIG. 7 illustrates an exemplary ring filtering arrangement using the feedback arrangement of the present invention to control/modify the wavelength(s) supported by the ring.

FIG. 7 illustrates an exemplary SOI-based wavelength selective arrangement (a ring resonator structure in this case) that may use feedback electronics 30 of the present invention to provide the desired degree of wavelength tuning and control. An exemplary waveguide 140 is shown in FIG. 7, where a ring-shaped waveguide 142 is also integrated within the same SOI layer of the SOI-based structure as waveguide 140, and disposed in relationship with waveguide 140 so as to out-couple light propagating at a particular, selected wavelength. As is well-known in the art, the size and shape of a ring waveguide can be configured to as to allow for a particular wavelength of light to be coupled out of the waveguide and into the ring (alternatively, a particular wavelength of signal injected into ring waveguide 142 may be thereafter coupled into waveguide 140). In the embodiment of FIG. 7, ring waveguide 142 is configured to out-couple light propagating at a selected wavelength $\lambda_1$ from the various set of wavelengths propagating along waveguide 140. Ring 142 may be "tuned" by virtue of a phase-shifting element 144 disposed, as shown, over a portion of ring 142. Phase-shifting element 144 may comprise, for example, a thermal or free-carrier based type of device. The application of an electrical signal to phase-shifting element 144 functions to alter the optical path length of ring 142 as "seen" by a propagating signal, thus altering the wavelength that will be coupled into ring 142. Although only a single ring 142 is shown in FIG. 7, it is to be understood that a plurality of rings may be disposed along waveguide 140, with each ring "tuned" to out-couple a different wavelength, so as to perform multiplexing/demultiplexing operations.

As shown in FIG. 7, a separate optical waveguide 146 is disposed adjacent to ring 142 to capture the signal propagating at wavelength $\lambda_1$ and allow the signal to continue to propagate through the SOI layer of the arrangement. In accordance with the present invention, a first optical detector 32-1 and associated tap-off waveguide 34-1 are disposed adjacent to waveguide 146 so as to remove a portion of the selected signal for analysis. A separate optical detector 32-2 and tap-off waveguide 34-2 are used to measure the signal remaining along the output of waveguide 140. Both of these measured signals are thereafter applied as inputs to feedback electronics 30, as shown. In particular, the pair of measured signals are first digitized within A/D signal processor 36 and then applied as digital inputs to control electronics 38. Control electronics 38 performs an analysis on the characteristics of the selected wavelength versus the remaining un-selected wavelengths (signal power, "drift" of wavelength, etc.) and based on this information, generates an electronic control signal that is applied as the feedback to phase-shifting element 144. The applied control signal thus is used to adjust the characteristics of ring 142, as necessary, to ensure that the proper wavelength(s) is out-coupled from waveguide 140. As with the various embodiments described above, a separate look-up table 42 and/or external system interface 50 may be used as part of feedback electronics 30.

Figure 8:
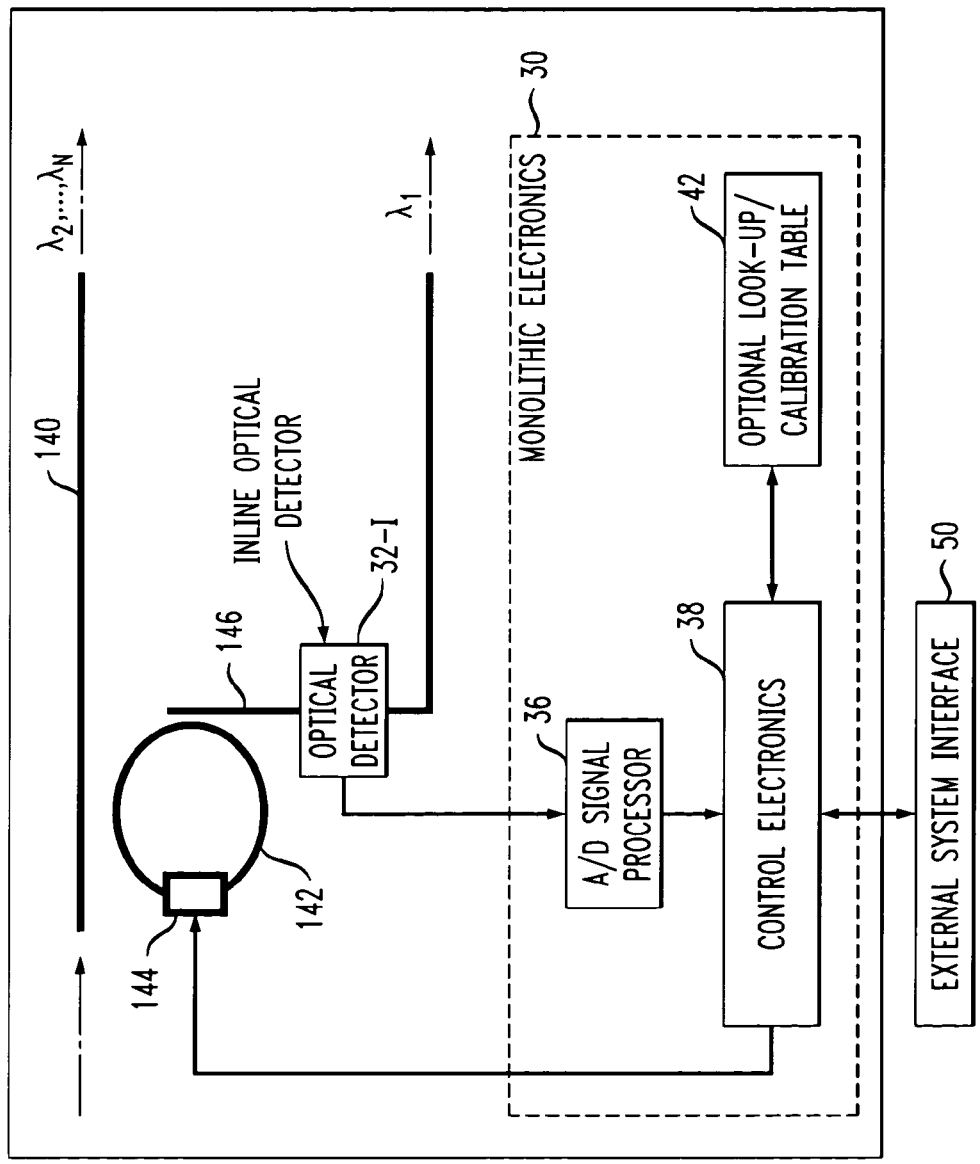
FIG. 8 illustrates a variation of the embodiment of FIG. 7, where an in-line optical detector is used in association with the feedback arrangement.
Figure 9:
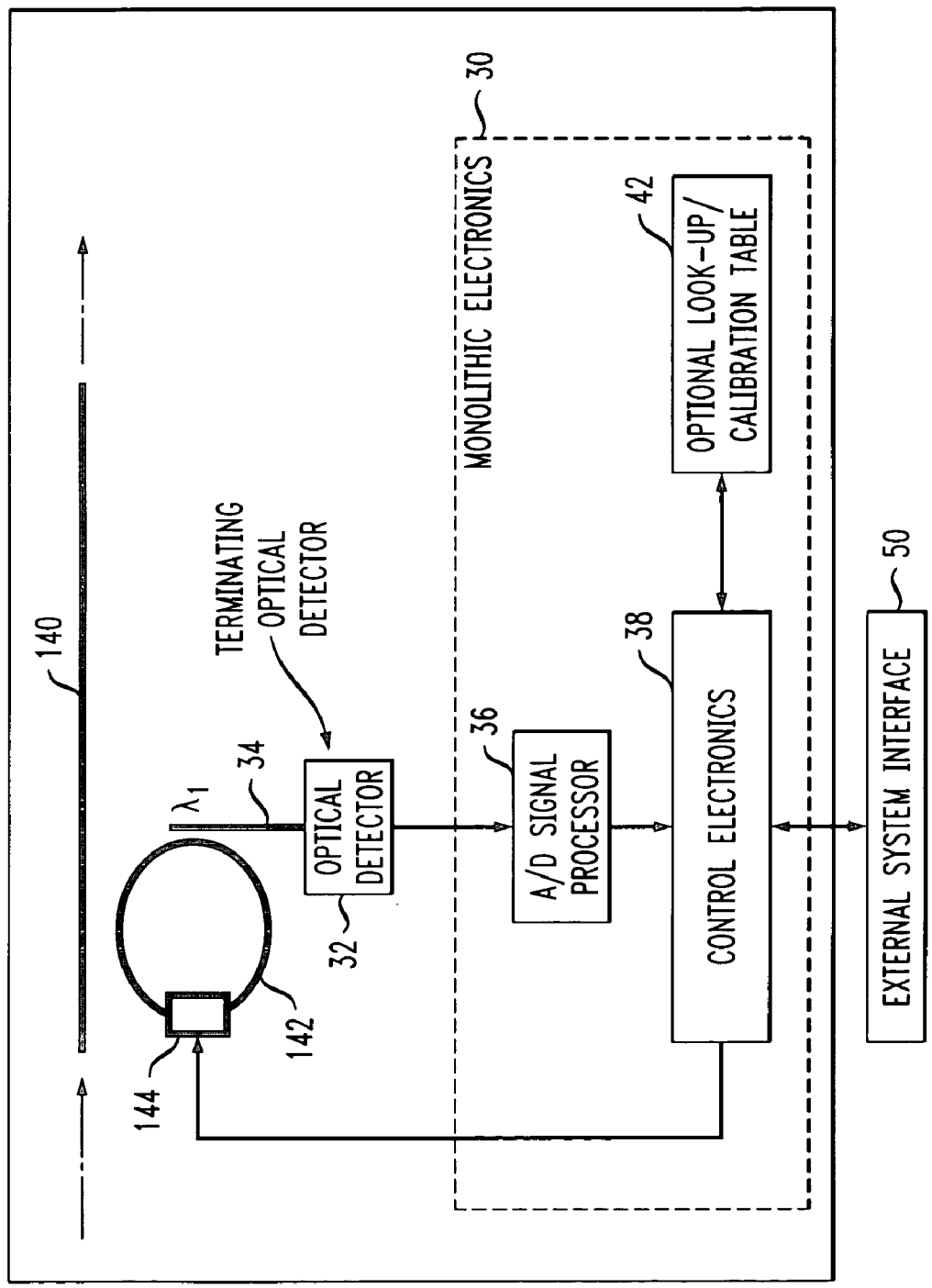
FIG. 9 illustrates another variation of the embodiment of FIG. 7, where in this case, a ring waveguide is used to block a signal from further propagation.

FIG. 8 illustrates a slight variation of the embodiment of the FIG. 7, where in this case, an in-line photodetecting device 32-I is disposed along waveguide 146, as shown. In particular, in-line photodetecting device 32-I may comprise a traveling waveguide detector structure that is integrated within waveguide 146. As with all of the other embodiments, the analog electrical output signal from photodetecting device 32-I is applied as the input to A/D signal processor 36 of feedback electronics 30. Another alternative to the arrangement of FIG. 7 is illustrated in FIG. 9, where in this particular case the out-coupled wavelength is simply "blocked" from further propagation. Therefore, for this embodiment, tap-off waveguide 34 associated with optical detecting device 32 is positioned adjacent to ring waveguide 142, so as to out-couple at least a portion of the particular wavelength that was removed from waveguide 140 by the action of ring 142. In the same manner as the embodiments of FIGS. 7 and 8, the measured signal as applied as an input to control electronics 38 may then be used to adjust the performance of ring 142 through the application of an electronic control signal to phase-shifting element 144.

Figure 10:
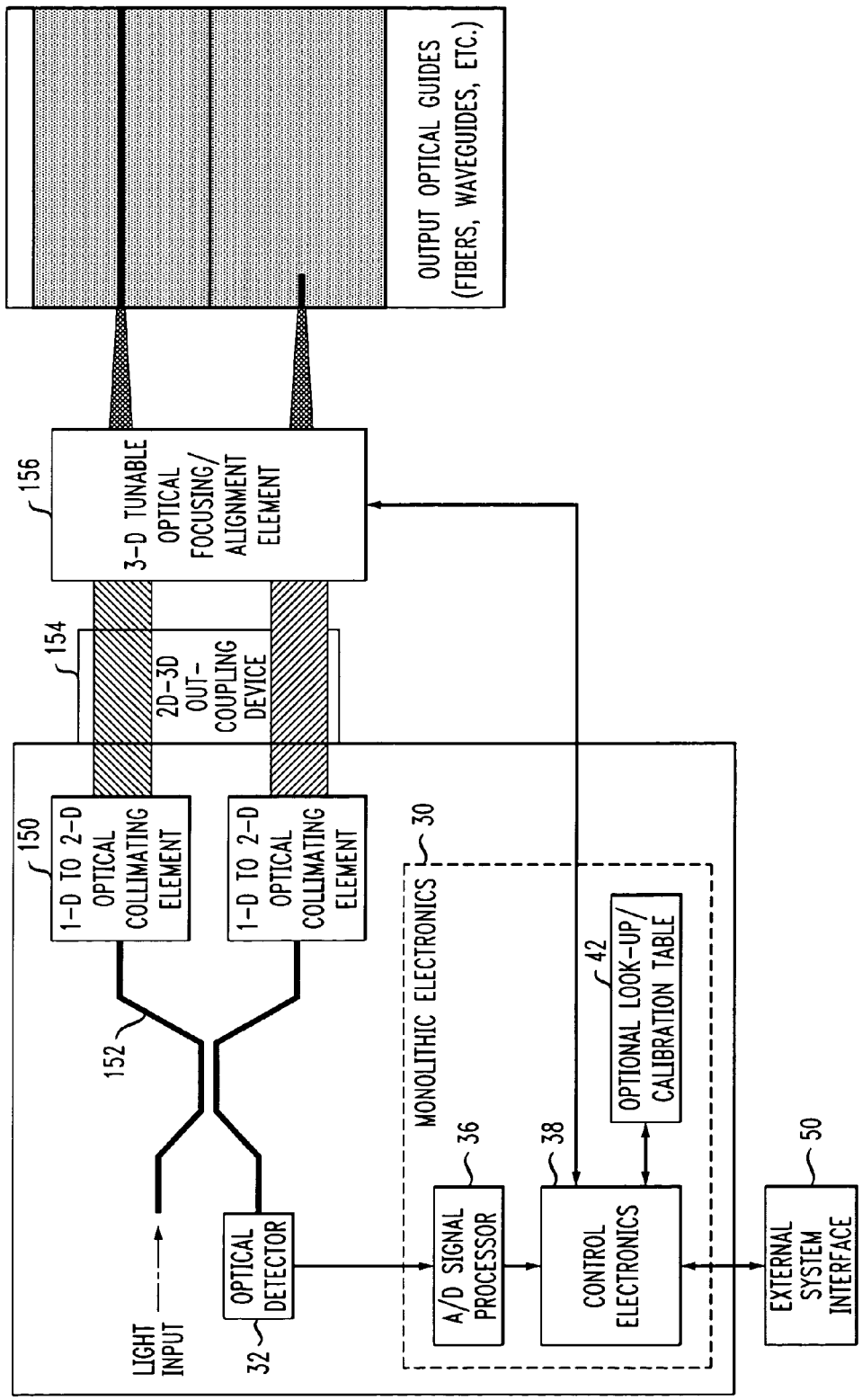
FIG. 10 contains a diagram of an exemplary optical output coupling structure as controlled by the inventive feedback arrangement of the present invention.

As mentioned above, proper coupling orientation at the input of an SOI-based structure is critical in achieving the desired degree of optical efficiency. Equally important is the output coupling arrangement utilized with SOI-based structures. FIG. 10 illustrates an exemplary embodiment of the present invention where monolithic feedback electronics 30 is utilized in association with an off-chip element to control the tuning, alignment and focusing qualities of an optical signal as it is coupled out of the SOI-based structure. In this case, the output coupling optics comprises a pair of collimating elements (for example, two-dimensional lenses) 150 are used within the surface of the SOI substrate to convert the one-dimensional signals propagating along waveguides 152 into a two-dimensional, collimated form. An out-coupling device 154, such as an optical prism, is then used to re-direct the two-dimensional signal out of the plane of the SOI substrate and into free space (where it is to be understood that various other types of coupling arrangements, such as tapers and/or gratings may be used for coupling). Tunable coupling element 156, as shown, is then used to properly direct this free space signal into associated guiding devices (such as optical fibers, or waveguides within a following structure).

Referring to FIG. 10, optical detector 32 is used to measure the amount of reflected signal present within an output coupling arrangement (where, of course, in the ideal arrangement the reflected signal would have a zero power value). By measuring the amount of reflected power, as translated into a digital signal by A/D processor 36, control electronics 38 may be used to adjust the orientation of off-chip tunable coupling element 156 so as to focus the free space propagating beam(s) into an associated optical fiber or other guiding element.

The foregoing description of specific embodiments of the present invention have been presented for purposes of illustration and description. They are not intended to be exhaustive or to limit the invention to the precise forms disclosed, and obviously many modifications and variations are possible in light of the above teaching. For example, while prism coupling is mentioned as the coupling technique for various embodiments, any suitable type of optical coupling for use with SOI-based structures may be employed and find benefit by virtue of incorporating the feedback arrangement of the present invention. Moreover, the feedback electronics may include one or more components that are supported on a separate substrate that is thereafter coupled to the SOI substrate supporting the opto-electronic elements (e.g., "flip-chip" bonded, stacking arrangement of substrates, etc.). Further, various types of photodetectors (discrete devices or integrated devices, waveguide-coupled or in-line) may be used to provide the input signal to the feedback electronics of the present invention. The embodiments selected for illustration were chosen and described in order to best explain the principles of the invention and its practical application, to thereby enable others skilled in the art to best utilize the invention and various embodiments, with various modifications as are suited to the particular use contemplated. It is intended that the scope of the invention be defined only by the claims appended hereto and their equivalents.

What is claimed is:

1. A monolithic opto-electronic feedback arrangement for controlling the light in at least one optical element formed within a single crystal silicon surface layer (SOI layer) of a silicon-on-insulator (SOI) structure, the monolithic feedback arrangement formed within the same SOI structure and comprising
   at least one optical photodetecting device disposed in the SOI layer to receive a portion of an optical signal propagating through the at least one optical element so as to measure the output optical signal power from the at least one optical element; and
   a control electronics module, responsive to the output signal from the at least one optical photodetecting device, for comparing the measured output signal power to predetermined values and applying a feedback control signal to the at least one optical element based upon the comparison.

2. The monolithic opto-electronic feedback arrangement as defined in claim 1 wherein the arrangement further comprises an optical coupling waveguide disposed in the SOI layer between the at least one optical photodetecting device and the at least one optical element so as to tap off a portion of the propagating optical signal and couple the tapped-off portion into the input of the at least one optical photodetecting device.

3. The monolithic opto-electronic feedback arrangement as defined in claim 1 wherein the at least one optical photodetecting device comprises an in-line optical photodetecting device disposed within the SOI layer along an output waveguide of the at least one optical element.

4. The monolithic opto-electronic feedback arrangement as defined in claim 1 wherein the arrangement further comprises an A/D converter disposed between the output of the at least one optical photodetecting device and the input of the control electronics module for converting a measured analog signal value input a digital representation for use by the control electronics module.

5. The monolithic opto-electronic feedback arrangement as defined in claim 1 wherein the arrangement further comprises a memory module including a look-up table disposed within the SOI structure and coupled to the control electronics module, the look-up table storing expected optical power values for use by the control electronics module.

6. The monolithic opto-electronic feedback arrangement as defined in claim 1 wherein the arrangement further comprises
   external control circuitry disposed beyond the SOI structure; and
   a communication interface for transmitting/receiving signals between the control electronics module and the external control circuitry.

7. The monolithic opto-electronic feedback arrangement as defined in claim 6 wherein the communication interface provides an input communication path for storing initialization values within the control electronics module.

8. The monolithic opto-electronic feedback arrangement as defined in claim 6 wherein the communication interface provides an output communication path for interrogating the control electronics module to determine its performance.

9. The monolithic opto-electronic feedback arrangement as defined in claim 1 wherein the at least one optical photodetecting device comprises a pair of optical photodetecting devices.

10. The monolithic opto-electronic feedback arrangement as defined in claim 9 wherein a first optical photodetecting device of the pair of optical photodetecting devices is disposed along an input optical waveguide section with the SOI layer of the SOI structure and a second, remaining optical photodetecting device is disposed along an output optical waveguide section within the SOI layer of the SOI structure.

11. The monolithic opto-electronic feedback arrangement as defined in claim 10 wherein the optical element comprises at least an optical filter is disposed between the first and second optical photodetecting devices, the feedback arrangement utilized to perform wavelength filtering feedback control.

12. The monolithic opto-electronic feedback arrangement as defined in claim 10 wherein the optical element comprises at least an optical wavelength blocking device disposed between the first and second optical photodetecting devices, the feedback arrangement utilized to adjust the selected wavelength to be blocked.

13. The monolithic opto-electronic feedback arrangement as defined in claim 10 wherein the optical element comprises at least one variable optical attenuator disposed between the first and second optical photodetecting devices, the feedback arrangement utilized to perform attenuation adjustment feedback control.

14. The monolithic opto-electronic feedback arrangement as defined in claim 1 wherein the optical element comprises an optical modulator, with the control electronics module output coupled to phase shifting sections of the optical modulator within the SOI layer of the SOI structure.

15. The monolithic opto-electronic feedback arrangement as defined in claim 1 wherein the at least one optical element comprises a plurality of optical elements.

16. The monolithic opto-electronic feedback arrangement as defined in claim 15 wherein the arrangement further comprises an electronic selector for controlling the interface between the plurality of optical elements and the control electronics module.

17. The monolithic opto-electronic feedback arrangement as defined in claim 1 wherein the arrangement further comprises at least one optical coupler, with the feedback arrangement used to adjust the coupling efficiency between the optical coupler and the at least one optical element.

18. The monolithic opto-electronic feedback arrangement as defined in claim 17 wherein the at least one optical coupler comprises an optical prism coupler, with the control electronics module output utilized to control the orientation and/or position of an optical signal with respect to an optical prism facet of the optical prism coupler.

19. The monolithic opto-electronic feedback arrangement as defined in claim 17 wherein the at least one optical coupler comprises an inverse tapered waveguide coupler.

20. The monolithic opto-electronic feedback arrangement as defined in claim 17 wherein the at least one optical coupler comprises an optical grating structure, with the feedback arrangement utilized to modify the period of the grating and adjust the associated optical coupling efficiency.

21. The monolithic opto-electronic feedback arrangement as defined in claim 17 wherein the at least one optical coupler comprises an input optical coupler.

22. The monolithic opto-electronic feedback arrangement as defined in claim 17 wherein the at least one optical coupler comprises an output optical coupler.

23. The monolithic opto-electronic feedback arrangement as defined in claim 1 wherein the at least one optical element is an optical switch.

* * * * *